(12) United States Patent
Sasaki

(10) Patent No.: US 8,574,332 B2
(45) Date of Patent: Nov. 5, 2013

(54) AIR CLEANER FOR MOTORCYCLES

(75) Inventor: Akira Sasaki, San Jacinto, CA (US)

(73) Assignee: Akira Sasaki, Perris, CA (US)

( * ) Notice: Subject to any disclaimer, the term of this patent is extended or adjusted under 35 U.S.C. 154(b) by 1062 days.

(21) Appl. No.: 11/096,815

(22) Filed: Mar. 31, 2005

(65) Prior Publication Data

US 2008/0072868 A1  Mar. 27, 2008

(51) Int. Cl.
*B01D 50/00* (2006.01)
*B01D 59/50* (2006.01)

(52) U.S. Cl.
USPC .................................. 55/385.3; 55/315

(58) Field of Classification Search
USPC .................................... 55/315, 385.3
See application file for complete search history.

(56) References Cited

U.S. PATENT DOCUMENTS

| | | | | |
|---|---|---|---|---|
| 2,999,562 A * | 9/1961 | Lechtenberg | .................... | 55/502 |
| 3,144,315 A * | 8/1964 | Hunn | .............................. | 96/421 |
| 3,238,707 A * | 3/1966 | Witkowski | ...................... | 55/510 |
| 3,323,293 A * | 6/1967 | Santi | ........................... | 55/385.1 |
| 3,491,519 A * | 1/1970 | Ettridge | .......................... | 55/357 |
| 3,606,740 A * | 9/1971 | Ballennie | ......................... | 55/500 |
| 3,624,161 A * | 11/1971 | Bub | ................................ | 55/521 |
| 3,759,018 A * | 9/1973 | Scholl | ............................. | 55/487 |
| 3,796,027 A * | 3/1974 | Gumtow | ......................... | 55/502 |
| 3,810,350 A * | 5/1974 | Scholl | ............................. | 55/487 |
| 3,969,785 A * | 7/1976 | Ogawa et al. | ................... | 15/301 |
| 4,187,091 A * | 2/1980 | Durre et al. | ..................... | 55/499 |
| 4,198,726 A * | 4/1980 | Powell, Jr. | ....................... | 15/312.2 |
| 4,745,013 A * | 5/1988 | Kudert et al. | ................ | 428/36.7 |
| 5,330,559 A * | 7/1994 | Cheney et al. | .................... | 95/63 |
| 5,820,644 A * | 10/1998 | Mori et al. | .................... | 55/385.3 |
| 5,824,407 A * | 10/1998 | Hayashi et al. | ............. | 428/318.8 |
| 5,935,284 A * | 8/1999 | Tokar et al. | ...................... | 55/485 |
| 6,464,761 B1 * | 10/2002 | Bugli | ............................... | 96/135 |
| 7,398,887 B2 * | 7/2008 | Choi | ............................... | 210/491 |

* cited by examiner

*Primary Examiner* — Amber Orlando
(74) *Attorney, Agent, or Firm* — Tracy M. Heims; Apex Juris, pllc

(57) ABSTRACT

A conical frustum shaped air cleaner comprised of a porous foam material in multiple layers. A cavity opening is formed at the center section of the flat bottom surface of the cleaner. The airflow resistance through the aforementioned foam material formed in the tapered side section of the cleaner is different from the airflow resistance through the foam material comprising the upper-surface section of the air cleaner. The desired airflow resistance is also controlled by selecting the appropriate number of layers, the appropriate thickness and the appropriate foaming ratio of the applicable foam materials that comprise the side-surface section and upper-surface section of the air cleaner.

7 Claims, 5 Drawing Sheets

AIR CLEANER FOR MOTORCYCLES

BACKGROUND OF THE INVENTION

1. Field of the Invention

The present invention provides an improved air cleaner, or filter, for internal combustion engines and particularly adapted for use with motorcycles, the filter having a conical frustum shape configured with foam materials in multiple layers.

2. Description of the Prior Art

Air filters designed for use with internal combustion engines have been available for many years. The air cleaner is typically installed in an air-cleaner case mounted beneath the seat and is connected to carburetor through the intake pipe.

Conventional air cleaners for off-road motorcycles are typically shaped as a conical frustum having a cavity opening at its inner section. The prior art air cleaner is typically made in a wet sponge format, i.e. foam sponge is immersed in viscous oil and then used with the air cleaner. In order to prevent reduced air flow due to dust deposits, the wet sponge filters utilize a double-layered structure wherein a coarse sponge is placed on the air cleaner outer layer and a covering a fine sponge placed as the inner layer. The sponges typically are the same thickness.

It is known that air cleaners are essential to protect the engine from dirt and sand in order to ensure its durability; engines having low ventilation resistance are considered desirable because air flow injected into the engine creates resistance. Current air filters result from a comprise between the ability to block dirt and sand and injected air resistance, air flowing evenly from many directions at the same time. In this regard, and referring to FIGS. 7-9, prior art air cleaner 50 utilizes different sponges 51 and 52 for its outer and inner layers, each sponge being made of the same material and of the same thickness for the entire surface area. This allows the same amount of air to flow into the air cleaner 50 from all surface areas. That in turn causes the air 51 flowing from the side-surface section to collide with the air 52 flowing from the upper surface section on the inside of the air cleaner 50 causing air turbulence. As a result the air intake to the engine decreases, decreasing engine efficiency.

U.S. Pat. No. 4,039,308 to Schiff discloses a device formed of rigid foam material which functions both to filter and straighten air introduced thereto prior to being directed to the vehicle air intake. Specifically, the device comprises an integral air filter and air straightening means made of the same porous material. The air straightening means performs two functions, i.e. that of cleaning air introduced thereto in a manner similar to that accomplished by an air cleaner while also reducing the turbulence of the cleaned air before being introduced to an air intake device, such as a carburetor.

Although the air cleaners disclosed in the prior art, such as illustrated in the '308 patent, provide an increased flow of cleaned air at the air intake of the internal combustion engine, the air flow comprises two components having two different velocity vectors; the resultant mixed air flow reducing the total amount of useful air flow to the air intake, thus reducing engine efficiency.

What is desired is to provide a simple, yet cost efficient, light weight air cleaner that creates increased air flow into the engine, thus increasing engine efficiency.

SUMMARY OF THE INVENTION

The present invention provides a conical frustum shaped air cleaner comprised of a porous foam material in multiple layers. A cavity opening is formed at the center section of the flat bottom surface of the cleaner. The airflow resistance through the aforementioned foam material formed in the tapered side section of the cleaner is different from the airflow resistance through the foam material comprising the upper-surface section of the air cleaner.

The present invention also controls the desired airflow resistance by selecting the appropriate number of layers, the appropriate thickness and the appropriate foaming ratio of the applicable foam materials that comprise the side-surface section and upper-surface section of the air cleaner.

The air cleaner of the present invention protects the engine from dirt and sand so as to ensure its durability and, at the same time, offers a measure of resistance to the flow of intake air to the engine. Traditionally, it has been regarded that an air cleaner with less resistance is better, so that the air cleaner has been the product of a compromise between the ability to prevent dirt and sand from entering the engine and the resistance to the intake airflow.

The present invention increases the amount of intake airflow volume and increases the engine's output power by controlling the smoothing airflow within the air cleaner as the result of a relative difference in the airflow resistances provided through the foam materials configuring the side-surface section and the upper surface section of the air cleaner and maximizing engine output power.

DESCRIPTION OF THE DRAWINGS

For a better understanding of the present invention as well as other objects and further features thereof reference is made to the following description which is to be read in conjunction with the accompanying drawing therein.

DESCRIPTION OF THE INVENTION

Figure 1:
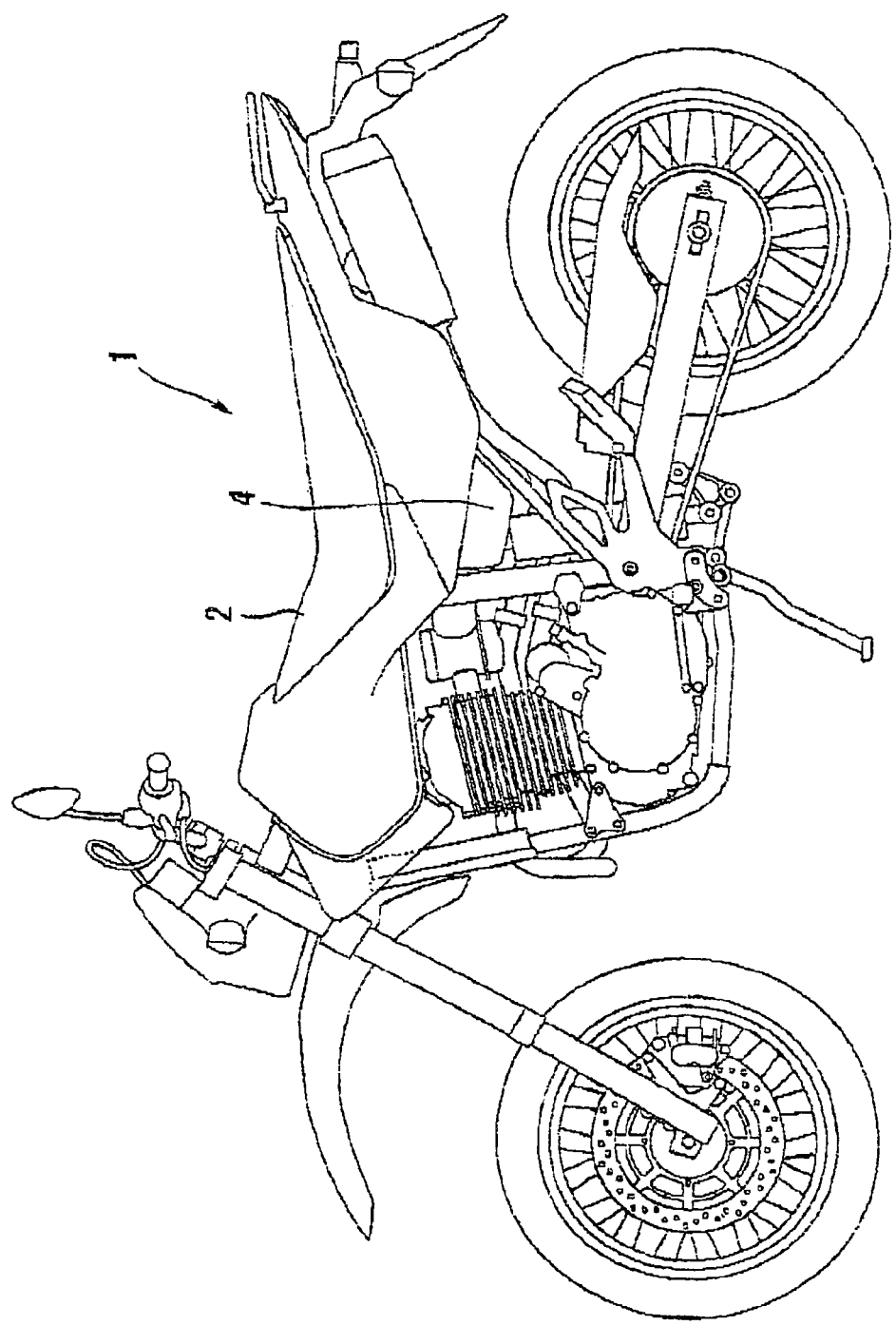
FIG. 1 is a perspective view of a motorcycle incorporating the teachings of the present invention.
Figure 2:
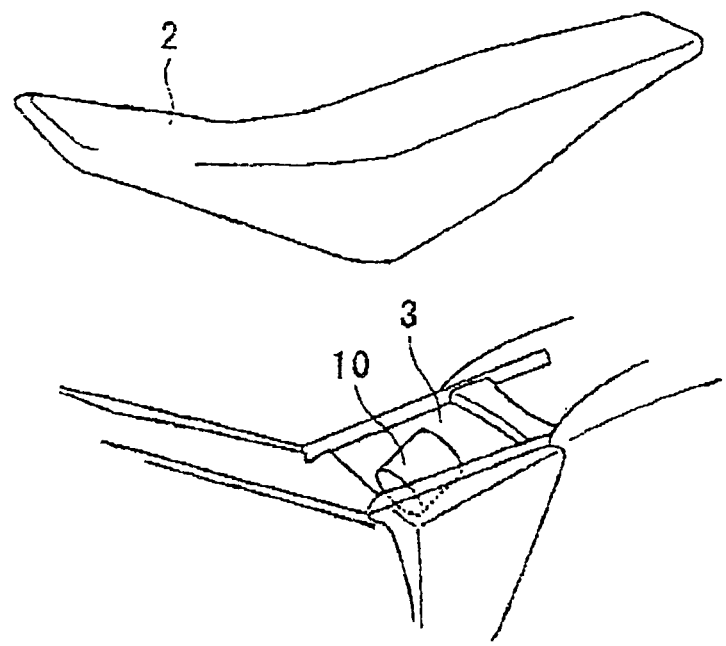
FIG. 2 is a view showing the motorcycle seat section and the location of the air cleaner of the present invention.

FIG. 1 is a left-side view of the motorcycle 1 illustrating seat 2 and intake pipe 4. FIG. 2 is a perspective view of the seat section 2 removed from the motorcycle 1 showing air cleaner case 3 mounted underneath the seat 2 of the motorcycle 1. In the front section of the air cleaner case 3, the conical frustum shaped air cleaner 10, which is described hereinafter, is installed with its bottom flat surface facing frontward. It should be noted that other shapes for the air cleaner can be used. In addition, the air cleaner may be located in positions other than below the seat. The intake pipe 4 is connected to the bottom flat surface section. The rear-end section of the air cleaner case 3 has an opening (not shown). The air flows through this opening, and the air cleaner 10 removes dirt and sand from the air. The air is then sent to the carburetor (not shown) via the intake pipe 4.

Figure 3:
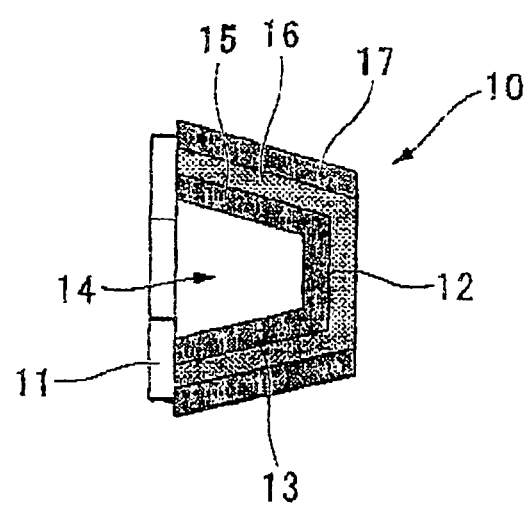
FIG. 3 is a cross-sectional view of a first embodiment of the air cleaner of the present invention.

FIG. 3 is a cross-sectional view of the first embodiment of this invention pertaining to the air cleaner of the present invention. Air cleaner 10 is illustrated as shaped as a conical frustum. The interior section has a cavity opening 14, which faces the bottom flat surface 11. The air cleaner 10 is made of a foam material such as foam urethane and is structured as two layers such that foam material layer 16 covers the side-surface section 13 and the upper-surface section 12 of foam material 15 which comprises the center cavity section 14. Additionally the side surface section 13 is structured as three layers, where foam material layer 17 covers the outer surface of foam material layer 16. Additionally, foam material layer 15, foam material 16 and the foam material layer 17 are made of the same basic material and of the same thickness. However, as compared to foam material layer 15, the foam material 16 and foam material 17 have a coarse foaming ratio. Foaming ratio as herein defined relates to the size, or diameter, of the openings in each foam layer.

Figure 4:
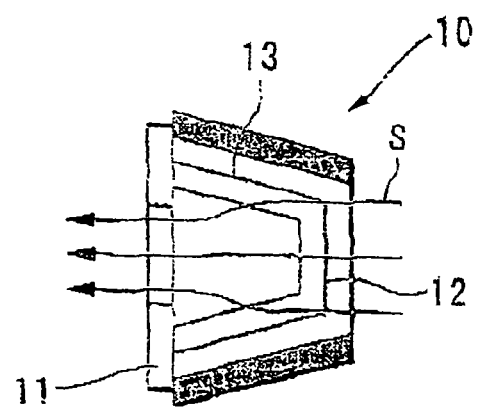
FIG. 4 illustrates air flow through the air cleaner of the present invention.

FIG. 4 shows the airflow within the air cleaner 10. In this embodiment of the invention, the air cleaner 10 is structured in three layers at the side surface 13 and has a larger airflow resistance as compared to the upper surface 12 section, where it is structured as two layers. As a result the airflow "S" into the air cleaner 10 is only from the upper surface 12, not from the side surface 13, thereby resulting in smooth, straight air flow and an increased volume of intake airflow. When the volume of intake airflow increases, the volume of fuel injection is also increased at the same ratio in order to maintain combustion efficiency. This combined increase in air intake volume and fuel injection volume produces a relative increase in engine output power.

Figure 5:
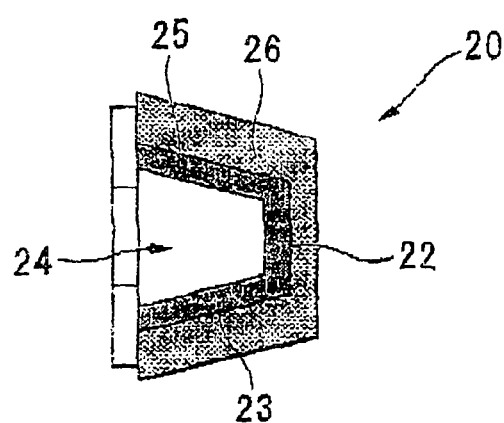
FIG. 5 is a cross-sectional view of a second embodiment of the air cleaner of the present invention.

FIG. 5 is a cross-sectional view of the second embodiment of the air cleaner of the present invention. In this embodiment, air cleaner 20 comprises foam material layer 26 which covers the outer surface of the foam material layer 25, which in turn shapes the center cavity opening 24 of the conical frustum, which is thicker at the side surface section 23 as compared to the thickness at the upper surface 22 section. Therefore, the airflow resistance at the side surface 23 is greater than it is at the upper surface 22. The air coming into the air cleaner case 3 is routed to the air cleaner 20 only through the upper surface 22 instead through the side surface 23. The result is a smooth, straight flow of air and a relative increase in the volume of intake airflow. Additionally, foam material layer 25 and the foam material layer 26 are made of the same basic material. However, as compared to foam material 25, foam material layer 26 has a coarse foaming ratio.

Figure 6:
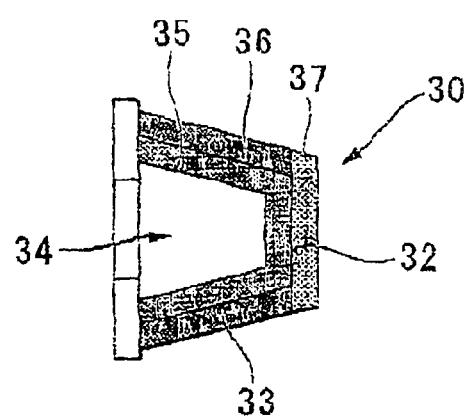
FIG. 6 is a cross-sectional view of a third embodiment of the air cleaner of the present invention.
Figure 7:
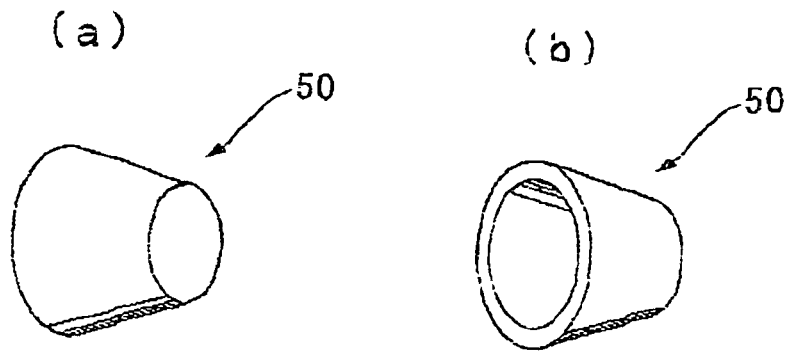
FIGS. 7-9 illustrate a prior art air cleaner.
Figure 8:
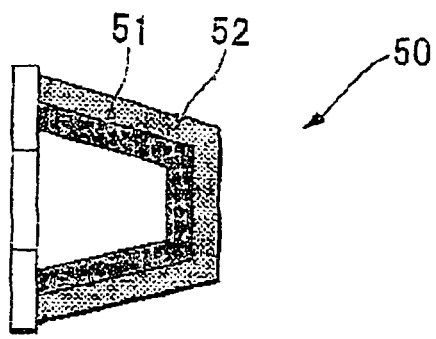
Figure 9:
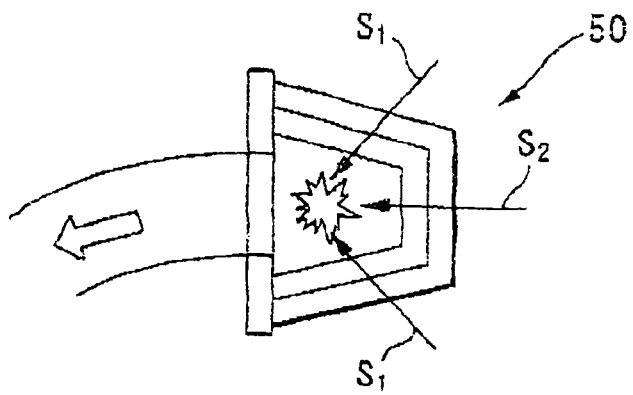

FIG. 6 is a cross-sectional view of the third embodiment of the air cleaner of the present invention. Air cleaner 30 comprises foam material layer 36, which covers the side surface 33 of the foam material layer 35, which in turn shapes the center cavity opening 34 of the conical frustum, has a finer foaming ratio than foam material layer 37 that covers the upper surface 32 section of the foam material layer 35. Therefore, the airflow resistance at the side surface 33 is greater than the airflow resistance at the upper surface 32. The air coming into the air-cleaner case 3 is routed into the air cleaner 30 only through the upper surface 32 instead of through the side surface 33. The result is a smooth, straight flow of air and a relative increase in the volume of intake airflow. Additionally, foam material layer 35, foam material layer 36 and foam material 37 have the same thickness.

Even though the number of layers, the thickness and the foaming ratio of the foam materials are varied independently in order to modify the airflow resistance in the embodiments noted hereinabove, in actual implementation any combination of these factors can be utilized.

In the embodiments described above, the airflow resistance through the side surface is increased relative to the upper surface. However, it is also acceptable to increase the airflow resistance through the upper surface as compared to the side surface. The point to note is that to create a smooth, straight flow of air within the air cleaner, different thicknesses at the upper and side surfaces are provided.

Figure 10:
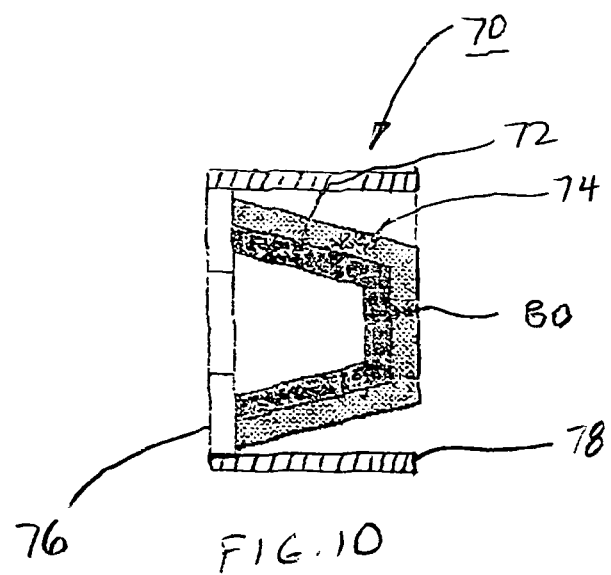
FIG. 10 is a fourth embodiment of the air cleaner of the present invention.

FIG. 10 illustrates a fourth embodiment of the present invention. In particular, air cleaner 70 comprises foam material outer layer 74 covering foam material inner layer 72 and bottom flat surface 76. A circumferential plate 78, preferably made of a plastic material, is positioned at the outer perimeter external wall of outer layer 74 and functions to minimize the air flow entering into the air cleaner through outer layer 74 while maximizing the air flow through the upper surface section 80.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An air filter for a combustion engine, comprising:
   a filtration membrane;
   a continuous side surface and a bottom surface, wherein
   said side surface has at least two layers of said filtration membrane, and
   said bottom surface has at least one layer less than said side surface of said filtration membrane and where said side surface is more air resistant than said bottom surface.

2. The air filter of claim 1 wherein
   said filtration membrane of said side surface and said bottom surface are made from foam urethane.

3. An air filter for a combustion engine, comprising:
   an outer filtration membrane and an inner filtration membrane;
   a continuos side surface and a bottom surface both made of said filtration membranes, wherein
   said side surface filtration membrane is thicker and more airflow resistant than said bottom surface filtration membrane;
   wherein at least said outer filtration membrane covers said inner filtration membrane and;
   where said outer filtration membrane has a coarser foaming ratio than said inner filtration membrane.

4. The air filter of claim 3 wherein
   the filtration membrane of said side surface and said bottom surface are made from foam urethane.

5. An air filter for a combustion engine, comprising: a first conical filtration membrane and a second conical filtration membrane; a continuous side surface made from said first conical filtration membrane and a bottom surface made from said second conical filtration membrane; wherein the porosity of said bottom surface of said conical second filtration membrane is greater than the porosity of said side surface first conical filtration membrane and a foaming ratio of said side surface is finer than a foaming ratio of said bottom surface such that said side surface has greater airflow resistance than said bottom surface.

6. The air filter of claim 5, wherein
   said side surface and said bottom surface filtration membranes are made from foam urethane.

7. The air filter of claim 5 wherein the thickness of said side surface and said bottom surface are substantially equal.

\* \* \* \* \*